US006156141A

United States Patent [19]

Shirakawa

[11] Patent Number: 6,156,141

[45] Date of Patent: Dec. 5, 2000

[54] METHOD FOR FORMING PHOSPHOR LAYERS OF PLASMA DISPLAY PANEL

[75] Inventor: Yoshimi Shirakawa, Kawasaki, Japan

[73] Assignee: Fujitsu Limited, Kawasaki, Japan

[21] Appl. No.: 09/127,335

[22] Filed: Jul. 31, 1998

[30] Foreign Application Priority Data

Apr. 13, 1998 [JP] Japan .................................. 10-101203

[51] Int. Cl.[7] ........................... B32B 31/10; B32B 31/12; B32B 31/26; H01J 9/227

[52] U.S. Cl. ........................... 156/67; 156/155; 156/230; 156/242; 156/244.11; 156/293; 156/305; 313/467

[58] Field of Search ............................ 156/67, 155, 230, 156/242, 244.11, 246, 249, 293, 297, 305; 313/467

[56] References Cited

U.S. PATENT DOCUMENTS

| | | | |
|---|---|---|---|
| 3,023,137 | 2/1962 | Colborne et al. . | |
| 5,925,203 | 7/1999 | Riddle et al. . | |
| 5,952,036 | 9/1999 | Tadaki et al. | 156/67 X |
| 5,984,747 | 11/1999 | Bhagavatula et al. . | |
| 6,012,388 | 1/2000 | Shirakawa et al. . | |

FOREIGN PATENT DOCUMENTS

| | | |
|---|---|---|
| 06267421 | 9/1994 | European Pat. Off. . |
| 0 806786 A1 | 11/1997 | European Pat. Off. . |
| 10172432 | 6/1998 | European Pat. Off. . |
| 5-299019 | 11/1993 | Japan . |

*Primary Examiner*—Curtis Mayes
*Attorney, Agent, or Firm*—Staas & Halsey LLP

[57] ABSTRACT

A method for forming a plurality of stripe-like phosphor layers on a surface of a substrate constituting a plasma display panel, the surface having a plurality of parallel ribs disposed thereon and grooves defined between two adjacent ribs, includes the steps of: molding a phosphor paste composed of a phosphor substance and a first synthetic resin into filament-like article; placing the molded filament-like article into each groove; filling the grooves with a solvent optionally containing a second synthetic resin compatible with the first synthetic resin; and conducting a sintering treatment of the substrate to form the phosphor layers in the grooves. An apparatus for forming a plurality of stripe-like phosphor layers on a surface of a substrate having a plurality of parallel ribs disposed thereon and grooves defined between two adjacent ribs, includes: a mounting base for mounting the substrate thereon and a supplier for supplying a filament-like article into the grooves, the filament-like article being made of a phosphor substance and a synthetic resin.

10 Claims, 9 Drawing Sheets

METHOD FOR FORMING PHOSPHOR LAYERS OF PLASMA DISPLAY PANEL

BACKGROUND OF THE INVENTION

1. Field of the Invention

The present invention relates to a method for forming phosphor layers of a plasma display panel (PDP), an apparatus for the method, a filament-like article for the method and a method for manufacturing the filament-like article. More particularly, the present invention relates to a method and apparatus for forming the phosphor layers in grooves each defined between ribs (partition walls) on a substrate in a manufacturing process of the plasma display panel.

2. Related Arts

A PDP is a display panel comprising a pair of substrates (typically, glass plates) disposed opposite to each other with a plasma discharge space sandwiched therebetween. When ultraviolet-ray excitation type phosphor layers disposed in the discharge space are excited by ultraviolet rays generated by electric discharge, the PDP displays colors. The PDP has three kinds of phosphor layers—R (red), G (green) and B (blue).

The phosphor layers of R, G and B are each formed using a process in which phosphor pastes containing phosphor powders are sequentially applied between ribs on a substrate by a screen printing method using a screen mask, followed by drying and sintering (for example, see Japanese Unexamined Patent Publication No. Hei 5(1993)-299019).

However, as the size of the PDP becomes larger, the alignment of ribs and mask-patterns becomes more difficult because of the distortion and extension of the masks. Therefore, it is becoming more difficult to apply phosphor pastes precisely among ribs.

SUMMARY OF THE INVENTION

The present invention has been made in view of the above circumstances. An object of the present invention is to form the phosphor layers uniformly and precisely among the ribs to form a large-sized PDP by means of a unique technique which places a filament-like article containing a phosphor among ribs.

The present invention provides a method for forming a plurality of stripe-like phosphor layers on a surface of a substrate constituting a plasma display panel, the surface having a plurality of parallel ribs disposed thereon and grooves each defined between two adjacent ribs, comprising the steps of: molding a phosphor paste composed of a phosphor and a first synthetic resin into a filament-like article; placing the molded filament-like article into each groove; filling the grooves with a solvent optionally containing a second synthetic resin compatible with the first synthetic resin; and conducting a sintering treatment of the substrate to form the phosphor layers in the grooves.

The present invention also provides an apparatus for forming a plurality of stripe-like phosphor layers on a surface of a substrate constituting a plasma display panel, the surface having a plurality of parallel ribs disposed thereon and grooves each defined among two adjacent ribs, comprising: a mounting base for mounting the substrate thereon and a supplier for supplying a filament-like article into each groove, the filament-like article being made of a phosphor and a synthetic resin.

The present invention also provides a filament-like article made by mixing a phosphor and a synthetic resin in a solvent, molding the resultant mixture into a filament shape and evaporating the solvent.

DETAILED DESCRIPTION OF THE PREFERRED EMBODIMENTS

Figure 1:
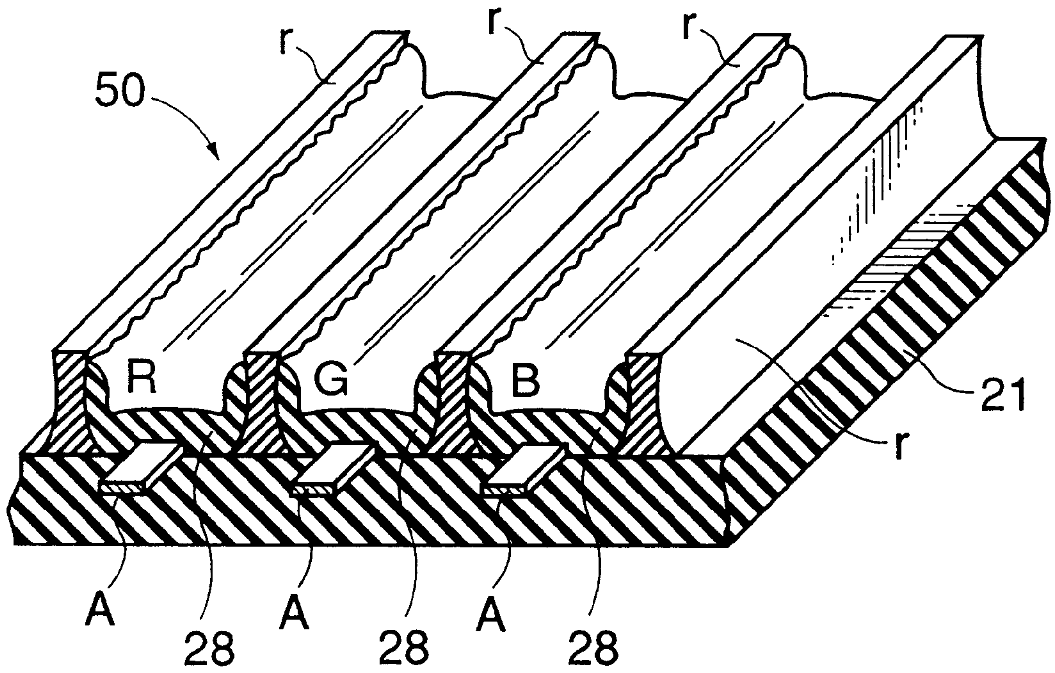
FIG. 1 is a perspective view showing an essential part of a plasma display panel according to the present invention.

The plasma display panel (PDP) as a subject of the present invention includes a pair of opposing substrate elements, one of which is a substrate element 50 (for one pixel) as shown in FIG. 1.

In the substrate element 50, address electrodes A are evenly spaced on an upper surface of a glass substrate 21. In this case, optional dielectric layers (not shown) made of a low-melting point glass may be laminated so as to cover the address electrodes A. A linear rib r is disposed among two adjacent address electrodes A directly or through the optional dielectric layers.

Phosphor layers 28 for displaying three colors R, G and B are disposed so as to cover concave areas including upper portions of the address electrodes A and sidewalls of the ribs r. Typically, the ribs r are formed through a screen printing method. In order to improve a precision for patterning the ribs, the ribs preferably are formed through a process of providing a resist mask corresponding to a rib pattern by photolithography on a flat layer made of a low melting point glass whose thickness corresponds to a height of the rib and patterning the flat layer into the ribs r by sandblast. In the case of carrying out the sandblast, the above-mentioned optional dielectric layers (not shown) may function to protect the address electrodes from damage caused by excessive sandblast.

In the method for forming the phosphor layers of the present invention, the step of molding the phosphor paste into the filament-like article may comprise printing the phosphor paste on a flat surface of the supporting members through a screen mask having a stripe-like opening pattern, subjecting the printed phosphor paste to thermal treatment and peeling the resulting filament-like article from the flat surface.

The step of molding the phosphor paste into the filament-like article may include applying the phosphor paste in a straight line via a nozzle on a surface of a rotating endless supporter and then continuously peeling the resulting filament-like article from the surface.

Further, this molding step may include applying the phosphor paste into groove-like recesses on a surface of the supporting member.

As for the filament-like article, the cross-sectional shape and a cross-area thereof are determined depending on the height and the interval of the ribs. The length of the filament-like article is required to be equal to on longer than that of the ribs.

For example, for a 42-inch PDP (panel size: 980 mm×580 mm) with ribs having a height of 140 μm and an interval of 300 μm, a filament-like article having a length of not less than 1000 mm and a cross section in either a semicircular shape of a radius of 100 to 130 μm or a rectangular shape of 100 μm×250 μm may be used.

The phosphor paste is made by mixing a powdery phosphor and a synthetic resin in a solvent. A content of the phosphor in the phosphor paste is preferably 20 to 60 wt %.

The phosphor substance contained in the phosphor paste may vary depending on its luminous color. Specific examples of the phosphor for red include $Y_2O_3$:Eu, $YVO_4$:Eu, $(Y,Gd)BO_3$:Eu, $Y_2O_3S$:Eu, γ—$Zn_3(PO_4)_2$:Mn and (Zn,Cd)S:Ag. Examples of the phosphor for green include $Zn_2GeO_2$:Mn, $BaAl_{12}O_{19}$:Mn, $Zn_2SiO_4$:Mn, $LaPO_4$:Tb, ZnS:(Cu,Al), ZnS:(Au,Cu,Al), (Zn,Cd)S: (Cu, Al), $Zn_2SiO_4$:(Mn,As), $Y_3Al_5O_{12}$:Ce, $Gd_2O_2S$:Tb, $Y_3Al_5O_{12}$:Tb and ZnO:Zn. Examples of the phosphor for blue include $Sr_5(PO_4)_3Cl$:Eu, $BaMgAl_{14}O_{23}$:Eu, $BaMgAl_{16}O_{27}$:Eu, $BaMgAl_{10}O_{17}$:Eu, ZnS:Ag and $Y_2SiO_3$:Ce.

As for the synthetic resin contained in the phosphor paste, any resin known in the art may be used. Specific examples of the synthetic resins include ethyl cellulose, nitrocellulose, acrylic resin and polyvinyl alcohol, and the synthetic resin may further contain a photosensitive resin or the like. Examples of the solvents include alcohols, terpineol, butyl carbitol acetate (BCA), butyl carbitol, toluene and butyl acetate.

The filament-like article may be obtained by forming the phosphor paste into a filament shape and drying the formed phosphor paste at not higher than 100° C. for a few minutes to a few hours. If the formed phosphor paste is dried above this temperature, the phosphor contained in the formed phosphor paste separates from each other, so that it is difficult to keep the filament-like article in the filament shape. It is noted that the required heat-treating time, and mechanical properties of the filament-like article such as rigidity, tenacity, flexibility and tensile strength may be controlled by varying an amount and the kind of the synthetic resin contained in the phosphor paste.

The step of placing the filament-like article into each groove may include a step of supporting both ends of the filament-like article above the substrate to align the filament-like articles with the corresponding groove and then lowering and placing the filament-like articles into the groove.

In this case, a plurality of filament-like articles are preferably supported at the same time. Thereby, the plurality of filament-like articles can be simultaneously and efficiently placed into the grooves.

Also, the step of placing the filament-like article into each groove may include providing a cylinder with a channel circumferentially formed thereon, putting the filament-like article into the channel and transferring the filament-like article from the channel to the corresponding groove with the cylinder rotated and moved on the substrate.

In this case, the cylinder may have an outer periphery length longer than the whole length of the rib.

Further, the cylinder may have an axial length longer than an arrangement width of all the ribs disposed on the substrate.

Further, the step of placing the filament-like article into each groove may include a step of providing a member having a nozzle for feeding the filament-like article and moving the member along the groove to feed the filament-like article through the nozzle into the groove. In the above case, if the member includes a plurality of nozzles spaced at a pitch which is an integer multiple of the rib pitch, a plurality of filament-like articles can be placed simultaneously and efficiently into the grooves.

According to the method for forming the phosphor layers of the present invention, the grooves are filled with a solvent after the filament-like article is put in each groove and thereby, the phosphor substance contained in the filament-like article is substantially dispersed in the solvent.

The viscosity of the solvent is required to be high so that it does not flow out from the ends of the grooves. Therefore, in order to increase the viscosity, a resin which is compatible with the synthetic resin contained in the filament-like article may be optionally added to the solvent. The solvent to be applied into the grooves may be the same as the one used for preparing the phosphor paste, but is not limited thereto.

The resin to be optionally added to the solvent may be the same as the one used for preparing the phosphor paste, but is not limited thereto.

A sintering treatment after applying the solvent into the grooves may be conducted, for example, at 450° C. for 30 minutes.

According to the present invention, the apparatus for forming the phosphor layers includes a mounting base for mounting a substrate having grooves and a supplier for supplying the filament-like article into each groove. This supplier may include a supporter for supporting both ends of the filament-like article parallel to the groove above the substrate, a mover for aligning the filament-like article with the corresponding groove by relatively moving the mounting base and the supporter in a direction perpendicular to the grooves, and a driver for placing the filament-like article into the groove by lowering the supporter.

In this case, if the supporter supports a plurality of filament-like articles spaced at a pitch which is an integer multiple of the rib pitch, the plurality of filament-like articles may be placed simultaneously and efficiently into the grooves.

Further, the supplier may be provided with a rotatable cylinder having a circumferential channel thereon, the supplier rotating the cylinder on the substrate to feed the filament-like article to the corresponding groove through the channel of the cylinder.

In this case, the cylinder may have an outer periphery longer than the length of the rib.

Further, the cylinder may have an axial length longer than the arrangement width of all the ribs disposed on the substrate.

Further, the supplier may include a member with a nozzle being capable of moving parallel to the grooves above the substrate, so that the filament-like article containing the phosphor and the synthetic resin may be placed into the corresponding groove through the nozzle.

In this case, the member preferably includes a plurality of nozzles spaced at a pitch which is an integer multiple of the rib pitch. Thereby, a plurality of filament-like articles can be placed simultaneously and efficiently into the grooves.

Further, the apparatus for forming the phosphor layer of the present invention may be provided with a cutter for cutting opposite ends of the filament-like article stuck out from the groove.

EXAMPLES

Hereafter, the present invention will be described in detail by way of Examples shown in the drawings.

Example 1

Figure 2:
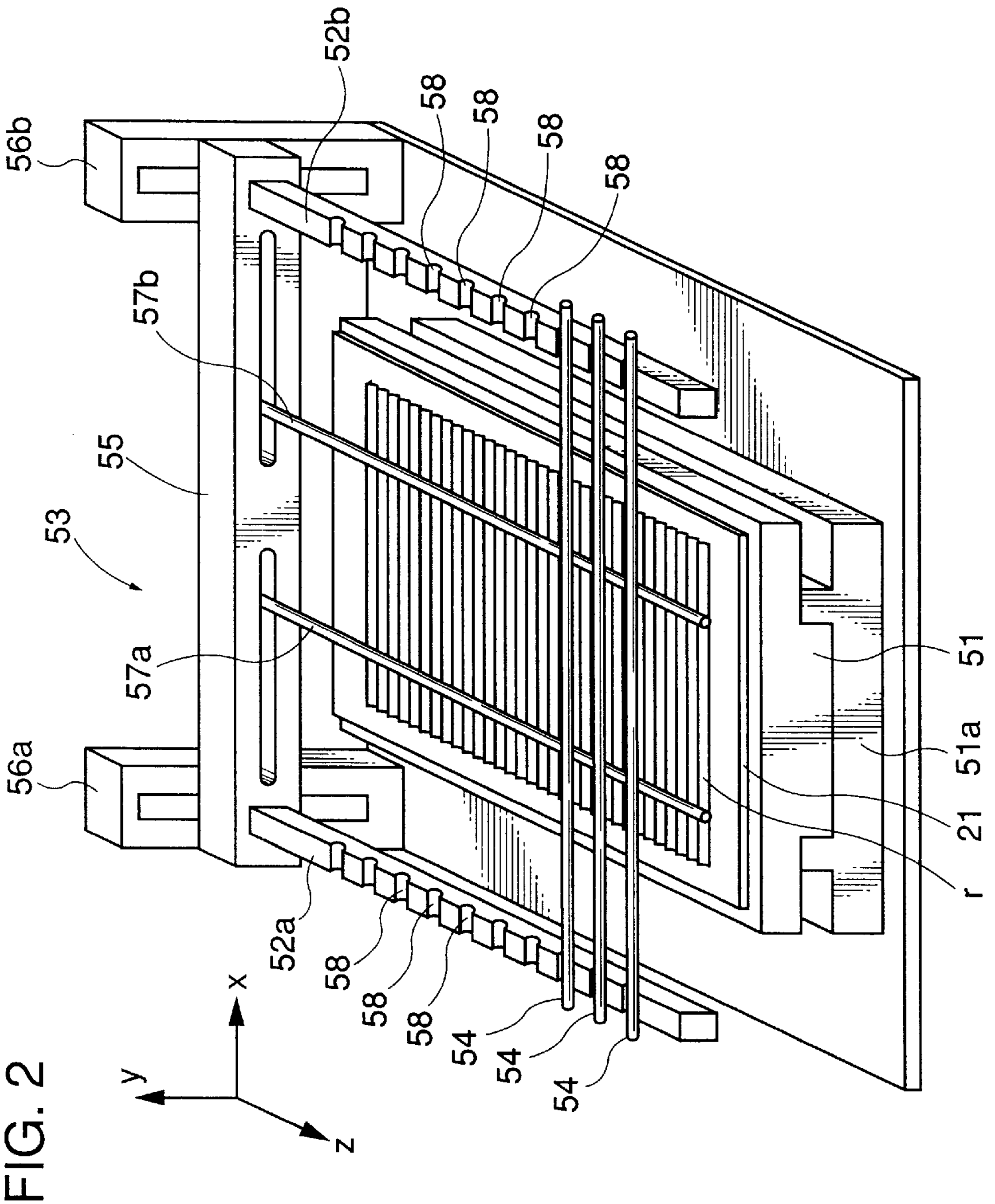
FIG. 2 is a perspective view showing an essential part of a first embodiment according to the present invention.

FIG. 2 is a perspective view showing an apparatus for supporting filament-like articles 54 and supplying the filament-like articles 54 into grooves g each defined between ribs r.

Figure 3:
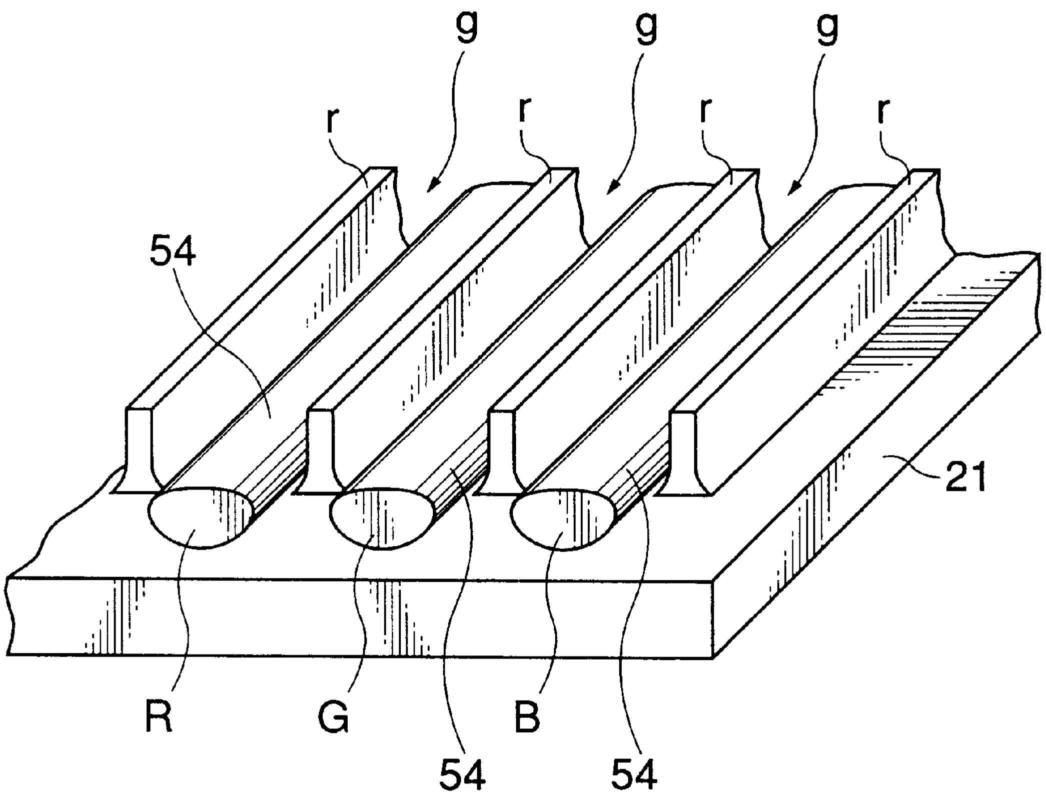
FIG. 3 is a perspective view showing a state of the first embodiment wherein filament-like articles are placed into grooves among ribs.

This apparatus includes, as shown in FIG. 2, a mounting base 51 for mounting a substrate 21 and a placing device 53 for placing the filament-like article 54 into each groove g between the ribs r as shown in FIG. 3.

The placing device 53 is provided with supporting arms 52*a* and 52*b* for supporting both ends of each of the filament-like articles 54 above the substrate 21 on the mounting base 51; a movable arm 55 for holding the supporting arms 52*a* and 52*b* parallel to z-axis; elevators 56*a* and 56*b* for moving the movable arm 55 up and down in the vertical direction (y-axis direction); and supporting bars 57*a* and 57*b* provided parallel to and between the supporting arms 52*a* and 52*b*.

The supporting bars 57*a* and 57*b*, each one end of which is supported by the movable arm 55, are constructed so as to be movable in the horizontal direction (x-axis direction) by means of a horizontal direction moving mechanism (not shown) built in the movable arm 55. The mounting base 51 is mounted on a sliding base 51*a* so as to be slidable in the z-axis direction. A plurality of notches 58 for positioning the filament-like articles 54 to be supported are formed on the upper surfaces of the supporting arms 52*a* and 52*b*. The pitch of the notches 58 is set to be three times as long as the pitch of the ribs r.

Constructed as mentioned above, at first, the substrate 21 is mounted on the mounting base 51 so that a longitudinal direction of the ribs r is parallel to the x-axis direction. Next, a predetermined number of the filament-like articles for red color are placed on the supporting arms 52*a* and 52*b* and then, opposite ends of each of the filament-like articles 54 are inserted in the notches 58.

The supporting bars 57*a* and 57*b* additionally support the filament-like articles 54 so as to prevent the filament-like articles 54 from bending. The mounting base 51 is slid in the z-axis direction to be positioned so that each filament-like article 54 is aligned right above a longitudinal axis of the corresponding groove g between the ribs. Then, the supporting arms 52*a* and 52*b* are lowered and stopped just before the supporting bars 57*a* and 57*b* touch the ribs r.

Next, the supporting bars 57*a* and 57*b* are retreated in the direction toward the supporting arms 52*a* and 52*b* respectively so that the supporting bars 57*a* and 57*b* are escaped from the substrate 21.

Next, the supporting arms 52*a* and 52*b* are further lowered. Thereby, the filament-like articles 54 are inserted in the corresponding grooves g. Then, the supporting arms 52*a* and 52*b* and the supporting bars 57*a* and 57*b* are allowed to return to the original position (home position) as shown in FIG. 2.

Next, with respect to filament-like articles for green color and blue color, the same operations as mentioned before are repeated. Thereby, the filament-like articles 54 for red (R), green (G) and blue (B) are placed consecutively in the corresponding grooves g on the substrate 21 as shown in FIG. 3.

Figure 4:
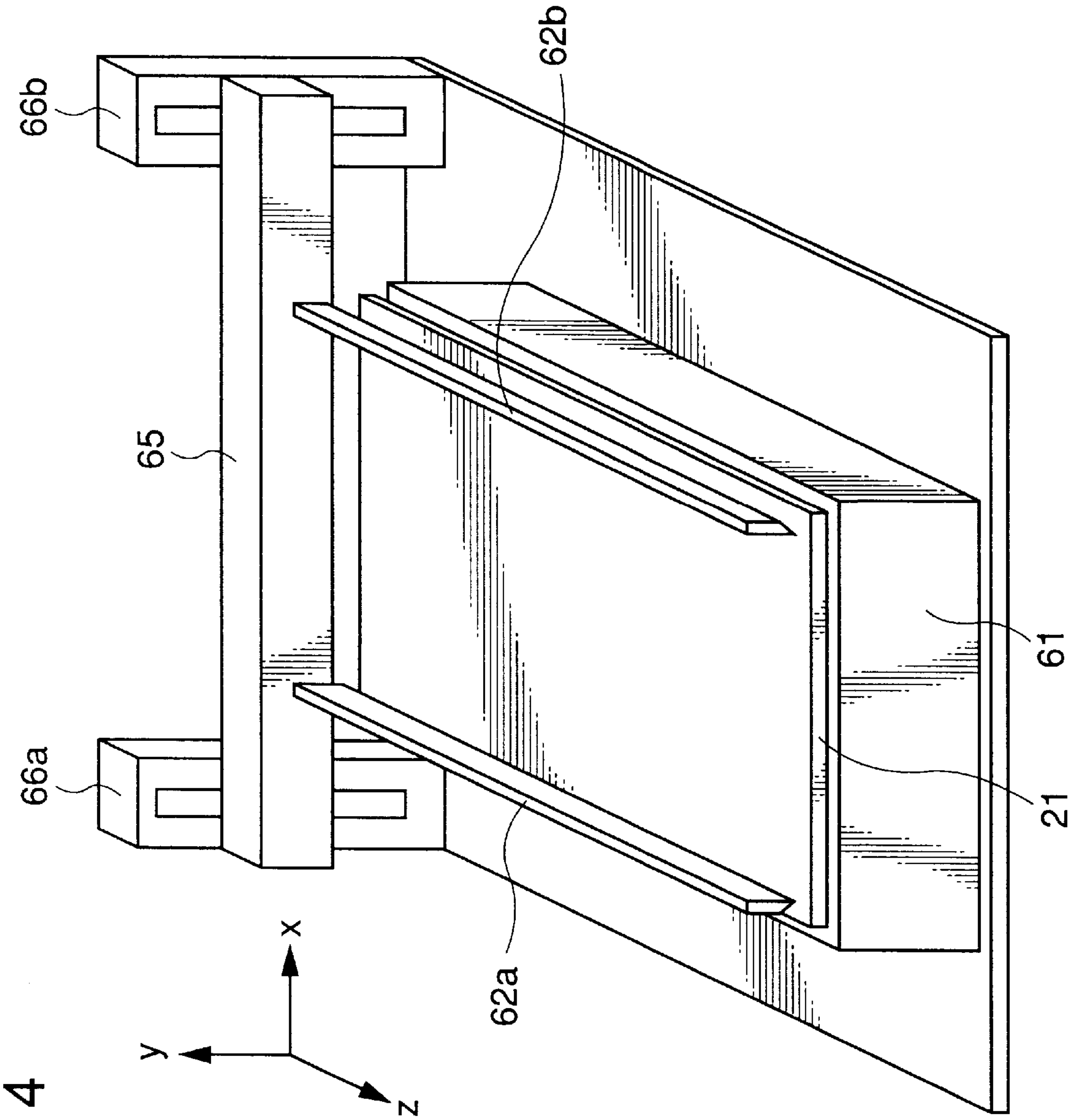
FIG. 4 is a perspective view showing an essential part of the first embodiment according to the present invention.

After placing the filament-like articles 54 into the grooves g, the substrate 21 is removed from the mounting base 51 and mounted on a mounting base 61 of a cutting device so that the longitudinal direction of the ribs r is parallel to the x-axis as shown in FIG. 4.

This cutting device is provided with a movable arm 65 having cutters 62*a* and 62*b*, which extend in the z-axis direction and are spaced at a little longer pitch than the length of the rib r, and elevator 66*a* and 66*b* for allowing the movable arm 65 to move up and down in the y-axis direction. The cutters 62*a* and 62*b* each have a blade on the lower edge thereof.

Here, by lowering the cutters 62*a* and 62*b* until they touch the substrate 21 mounted on the mounting base 61, the filament-like articles 54 protruding from the ends of the ribs r are cut away.

Next, the substrate 21 is removed from the mounting base 61. Then, a (paste-like) mixture of ethyl cellulose and BCA is applied on the surface of the substrate 21, for example, by screen printing and thereby, all the grooves g between the ribs r are filled with this mixture at the same time. Then, the substrate 21 is left at a room temperature for about 2 hours.

After being dried at 100° C. for 30 minutes, the substrate 21 is sintered at 450° C. for 30 minutes to form phosphor layers 28 for respective colors, i.e., red (R), green (G) and blue (B) between the ribs as shown in FIG. 1.

Figure 5A:
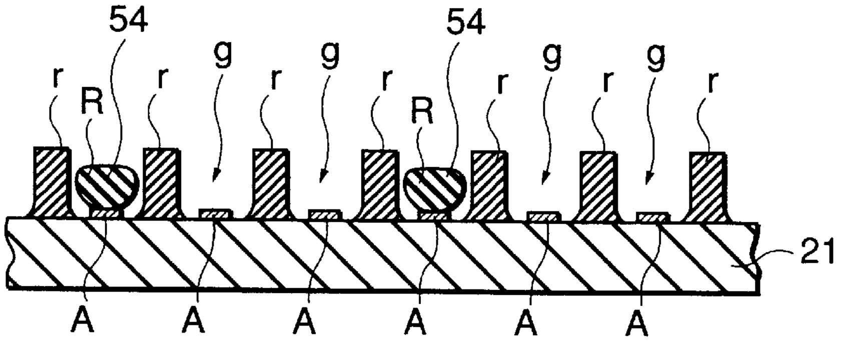
FIGS. 5(*a*)–5(*e*) show production steps of the first embodiment according to the present invention.
Figure 5B:
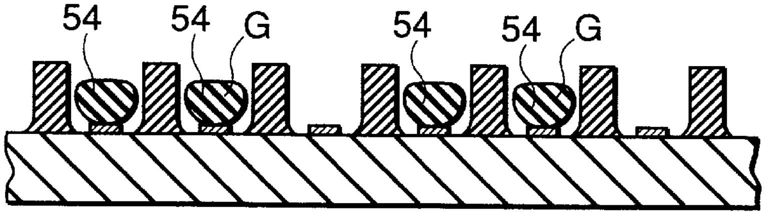
Figure 5C:
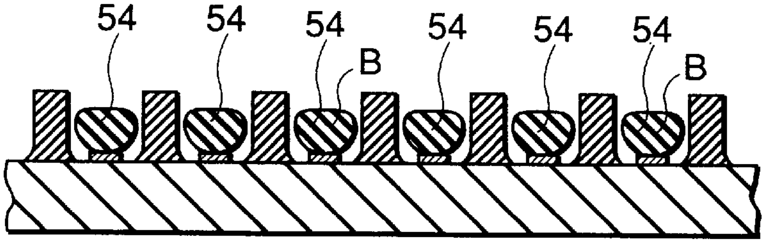
Figure 5D:
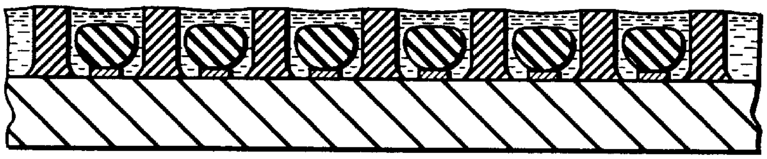
Figure 5E:
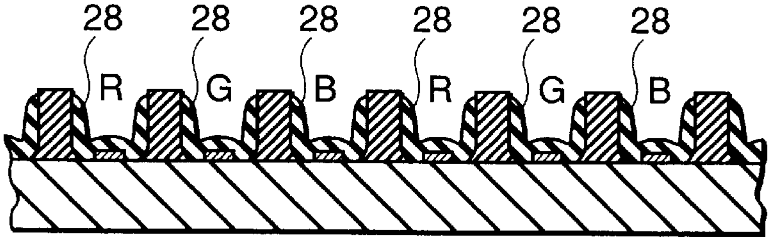

The above-mentioned steps are explained with reference to FIG. 5. First, the filament-like articles 54 for red (R) are placed into the grooves g as shown in FIG. 5(*a*) and then, the filament-like articles 54 for green (G) as shown in FIG. 5(*b*) and the ones for blue (B) as shown in FIG. 5(*c*) are placed consecutively. Next, a mixture of ethyl cellulose and BCA is applied into the grooves g as shown in FIG. 5(d) and then, the substrate 21 is subjected to drying and sintering treatments. Thereby, the phosphor layers 28 for each color are made as shown in FIG. 5(*e*).

Example 2

Figure 6:
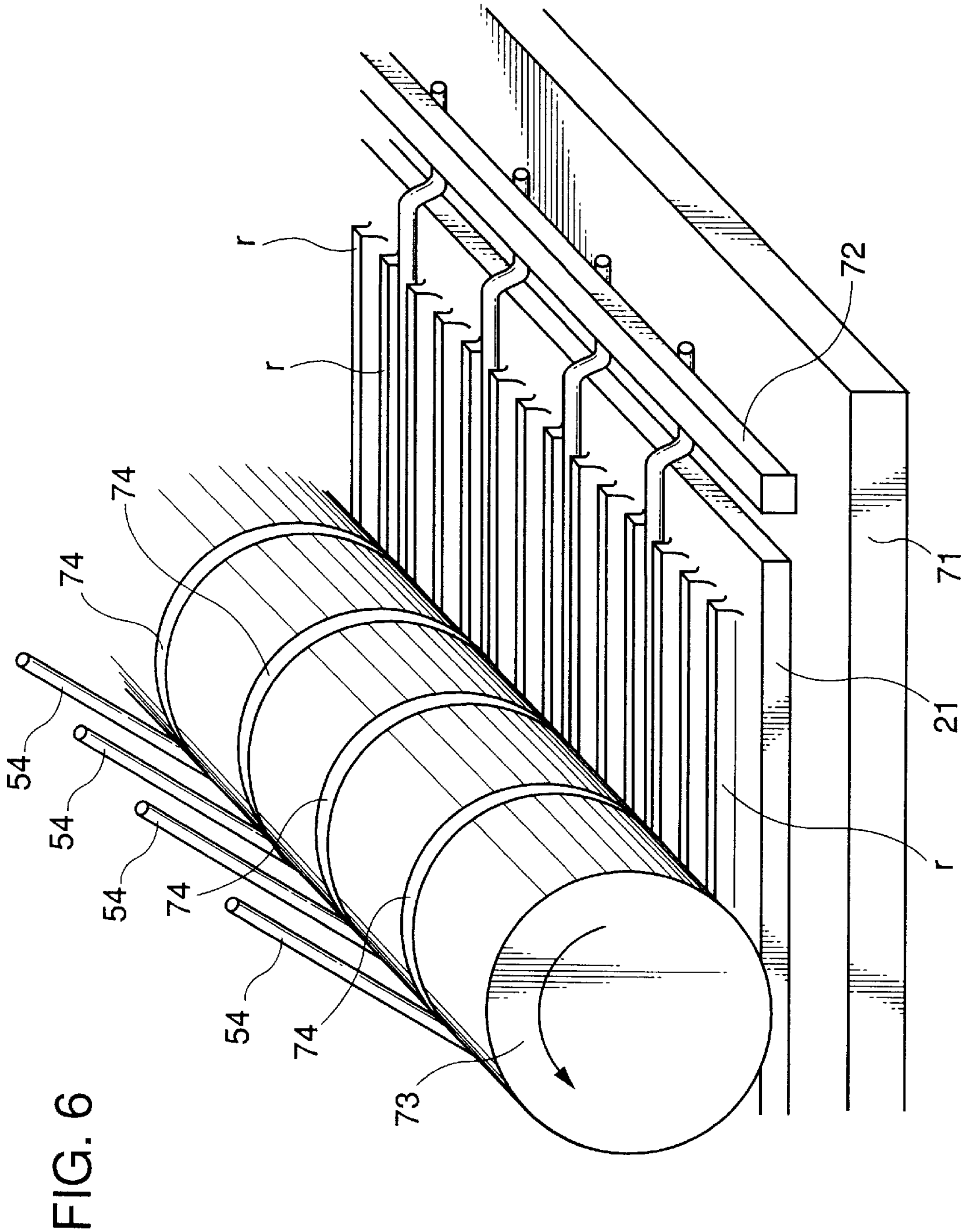
FIG. 6 is a perspective view showing an essential part of a second embodiment according to the present invention.

FIG. 6 is a perspective view showing Example 2 according to the present invention. In this Example, first, the substrate 21 is mounted on a mounting base 71. Then, one end of each of a plurality of filament-like articles 54 for red color is fixed at one end of the ribs outside of the substrate 21 by a fixing tool 72. The filament-like articles 54 are placed along channels 74 provided on the outer periphery of a cylinder 73 in the circumference direction of the cylinder 73 and then guided and inserted into the grooves g by rotating the cylinder 73 on the substrate 21 in the direction indicated by an arrow.

Next, the filament-like articles for green color and blue color are inserted into the corresponding grooves g by carrying out similar steps as mentioned above except that the channels 74 are shifted by one pitch of the rib r in the axis direction of the cylinder 73. After the filament-like articles 54 for all colors are inserted in all the grooves g, the redundant filament-like articles at the ends of the ribs are cut away by the apparatus shown in FIG. 4. Afterwards, the steps are conducted in the same manner as described in Example 1.

It is noted that the pitch of the channels 74 on the outer periphery of the cylinder 73 is set to be three times as long as the pitch between the ribs r. The length of the cylinder 73 in the axis direction is set to be longer than the total array width of the ribs r on the substrate 21 so that a necessary number of the filament-like articles for each color can be inserted at the same time. Moreover, a circumference length of the cylinder 73 is set to be longer than the length of the rib r, so that the filament-like articles may be completely inserted in the longitudinal direction of the ribs r by less than one turn of the cylinder 73.

Example 3

Figure 7:
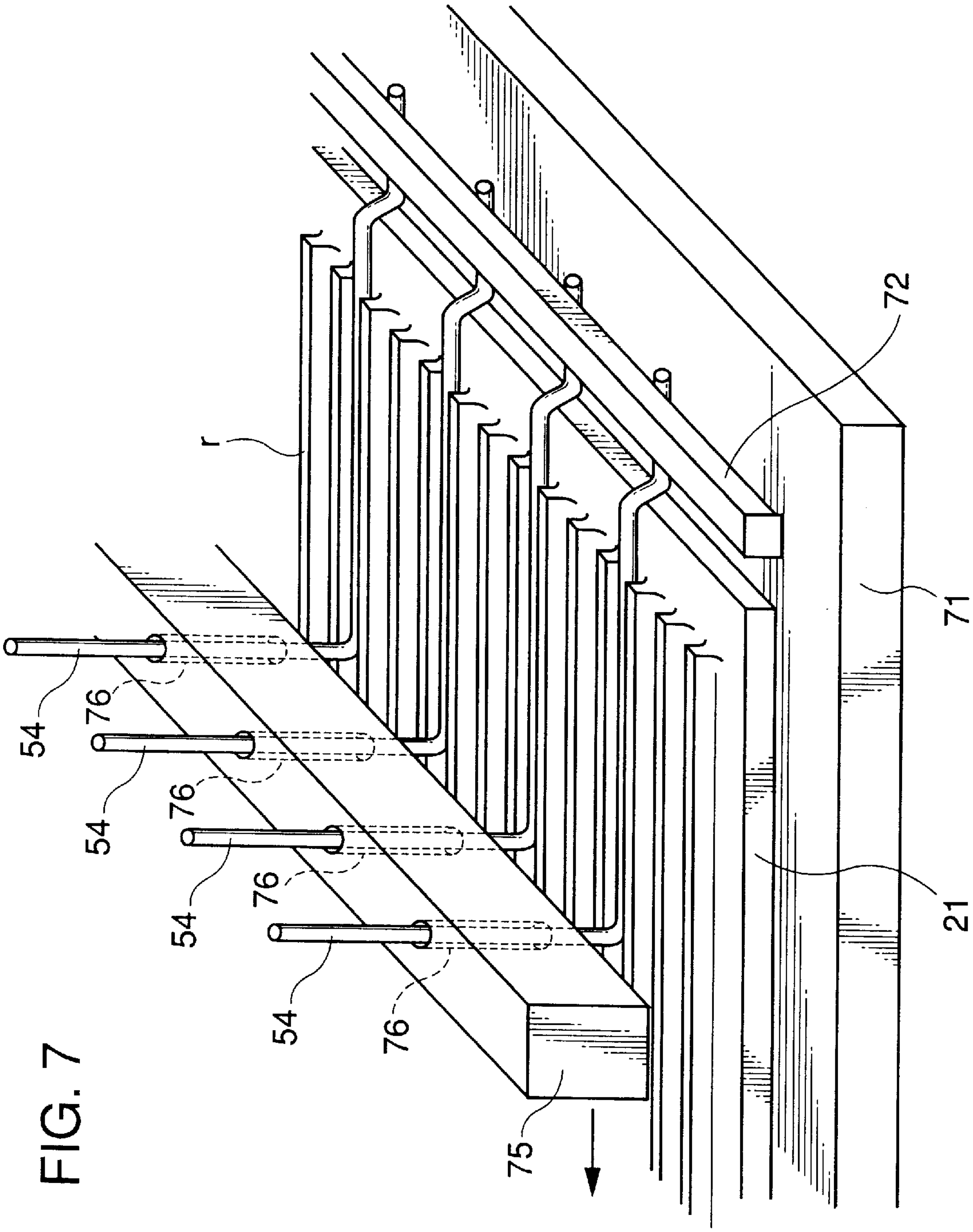
FIG. 7 is a perspective view showing an essential part of a third embodiment according to the present invention.

This Example is similar to Example 2 in structure except that the cylinder 73 of Example 2 is replaced by a nozzle section 75 having a plurality of nozzles 76 as shown in FIG. 7.

In this Example, first, the substrate 21 is mounted on the mounting base 71. Then, one end of each of a plurality of filament-like articles 54 for red color is passed through each nozzle 76 of the nozzle section 75 and fixed at one end of the ribs outside of the substrate 21 by the fixing tool 72. Then, the nozzle section 75 is allowed to travel in the direction indicated by an arrow, i.e., the longitudinal direction of the ribs r and thereby, the filament-like articles 54 are guided and inserted into corresponding grooves.

Next, the filament-like articles 54 for green color and blue color are mounted into the corresponding grooves g by carrying out the similar steps as mentioned above except that the nozzle section 75 is shifted by one pitch of the rib r in the direction perpendicular to the ribs r.

Afterwards, the steps are conducted in the same manner as described in Examples 1 and 2. A pitch of the nozzle 76 are set three times as long as the pitch of the ribs r.

Next, a method for forming the filament-like article of the present invention is described with reference to Examples 4 to 7 provided hereinbelow.

Example 4

First, for example, 10 to 50 wt % of a phosphor powder substance for a color, 5 to 10 wt % of ethyl cellulose and 40 to 85 wt % of BCA are mixed uniformly to prepare a phosphor paste for the color.

Here, (Y,Gd) $BO_3$:Eu for a red phosphor, $Zn_2SiO_4$:Mn for a green phosphor and $BaMgAl_{10}O_{17}$:Eu for a blue phosphor are used.

Figure 8:
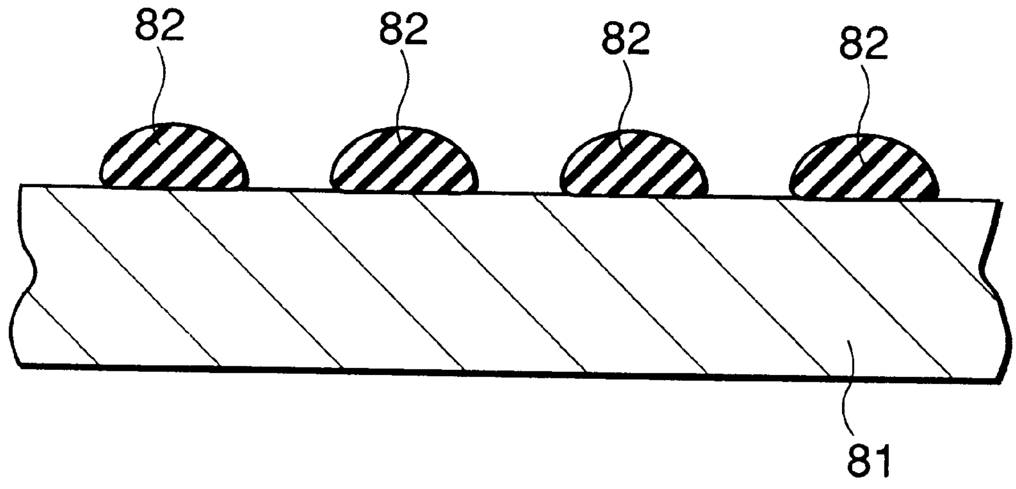
FIG. 8 is a cross-sectional view showing an essential part of a fourth embodiment according to the present invention.

Then, a phosphor paste 82 is applied on a plain substrate 81 as shown in FIG. 8 by carrying out the step of (1) printing the phosphor paste 82 on the substrate 81 through a screen mask (not shown) having straight opening patterns or (2) applying the phosphor paste 82 linearly on the substrate 81 by moving a nozzle having a given inner diameter (not shown) relative to the substrate 81 while allowing the nozzle to eject the phosphor paste 82.

Then, after plural lines of the phosphor paste 82 are applied on the substrate 81 by one meter in length, the plural lines of the phosphor paste 82 are dried at not more than 100° C., for example at 60° C., for 30 minutes to solidify the phosphor paste 82. By peeling the plural lines of the solidified phosphor paste 82 from the substrate 81, the filament-like articles 54 are obtained. In this case, a cross section of the filament-like article is almost like a semicircle by a surface tension effect of the phosphor paste, and a size of the filament-like article is determined depending on the size of the opening pattern or the inner diameter of the nozzle and traveling speed of the nozzle.

Example 5

Figure 9:
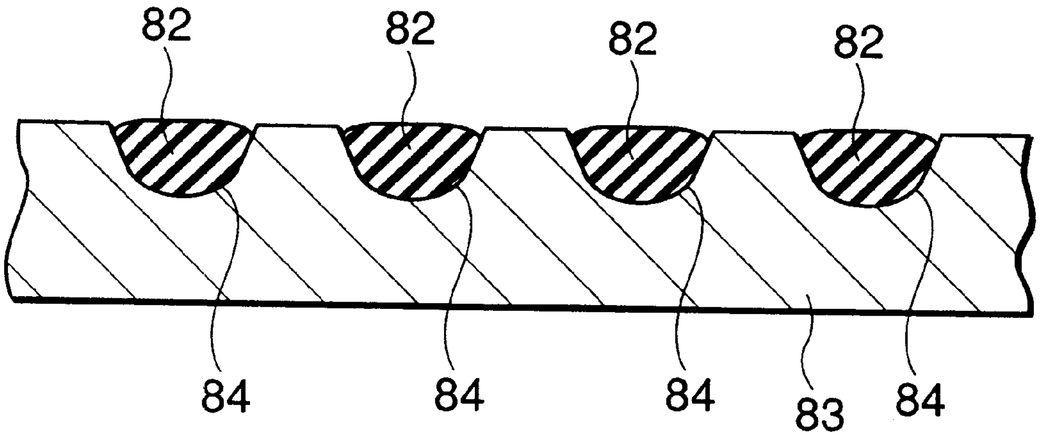
FIG. 9 is a cross-sectional view showing an essential part of a fifth embodiment according to the present invention.

This Example is a modification of Example 4. The phosphor paste 82 prepared by the method described in Example 4 is applied in a plurality of linearly-extending groove-like recesses 84 (semicircular in cross section) provided in a mold 83 as shown in FIG. 9 and then, dried at 80° C. for 30 minutes to solidify the phosphor paste 82 in the groove-like recesses 84.

Then, by peeling the solidified phosphor paste 82 from the substrate 81, the filament-like articles 54 are obtained. In this case, a cross section of the filament-like article 54 may be made into a desired shape, such as a trapezoid, a rectangle or the like by changing a shape of the groove-like recesses 84. If mechanical properties of the filament-like article such as flexibility, tenacity, rigidity and tensile strength must be adjusted, they may be controlled by changing a content and a kind of the synthetic resin in the phosphor paste.

Example 6

Figure 10:
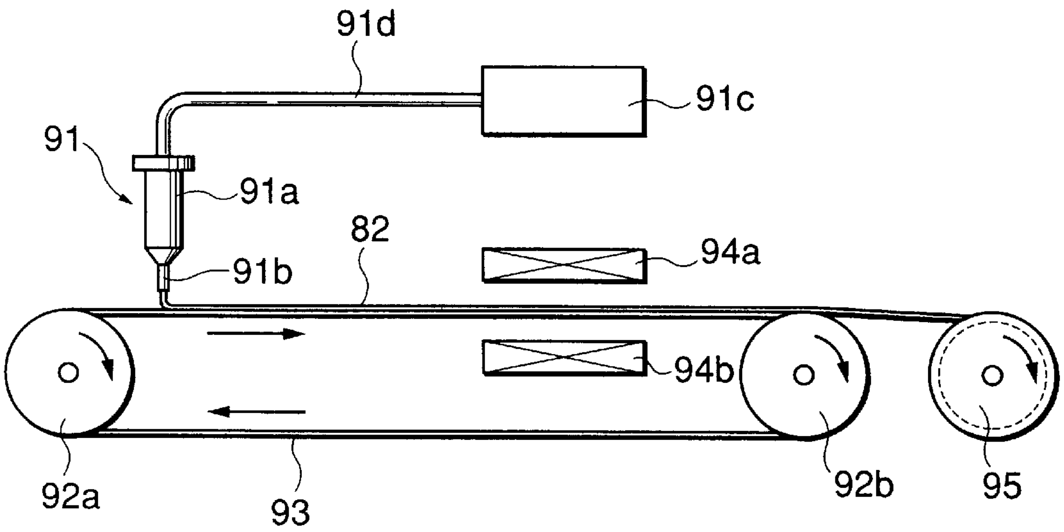
FIG. 10 is an explanatory view showing an essential part of a sixth embodiment according to the present invention.

FIG. 10 is a view showing an another apparatus for forming the filament-like article in this Example. Referring to FIG. 10, a dispenser 91 is provided with a syringe 91*a*, a nozzle 91*b*, an air supplier 91*c* and an air tube 91*d*. A steel belt 93 is hung as an endless supporter over two rotating rollers 92*a* and 92*b* with two heaters 94*a* and 94*b* provided facing each other above and under a part of the steel belt 93. A winding reel 95 is provided adjacent to the rotating roller 92*b*.

With this structure, the phosphor paste prepared in Example 4 is loaded in the syringe 91*a*. When an air pressure is applied to the syringe 91*a* through the air tube 91*d* from the air supplier 91*c*, the phosphor paste 82 is ejected in a filament shape on the steel belt 93 through the nozzle 91*b*. Prior to this, the steel belt 93 is allowed to operate at a speed corresponding to the speed of ejecting the phosphor paste 82 by the rotating rollers 92*a* and 92*b* in the direction indicated by an arrow in FIG. 10.

The ejected filament-like phosphor paste 82 is transported on the steel belt 93 toward the reel 95, and then dried by the heaters 94*a* and 94*b* to form a filament-like article and wound by the reel 95. The cross section of the filament-like article is determined depending on an inner diameter of the nozzle 91*b*. The condition for drying the phosphor paste ejected from the nozzle 91*b* is determined depending on an ejecting speed, i.e., a speed of the steel belt 93, a length of a heating zone composed of the heaters 94*a* and 94*b* and a heating temperature.

Grooves having a size corresponding to an outer diameter of the ejected filament-like phosphor paste 82 may be provided on the surface of the steel belt 93 so as to guide the filament-like phosphor paste in a direction from the nozzle 91*b* to the reel 95. Thereby, meandering of the phosphor paste 82 can be prevented.

It is to be noted that, if three dispensers 91 are built in the apparatus shown in FIG. 10, three kinds of filament-like articles containing the phosphor each for red, green and blue can be formed on the steel belt 93 at the same time.

Example 7

Figure 11:
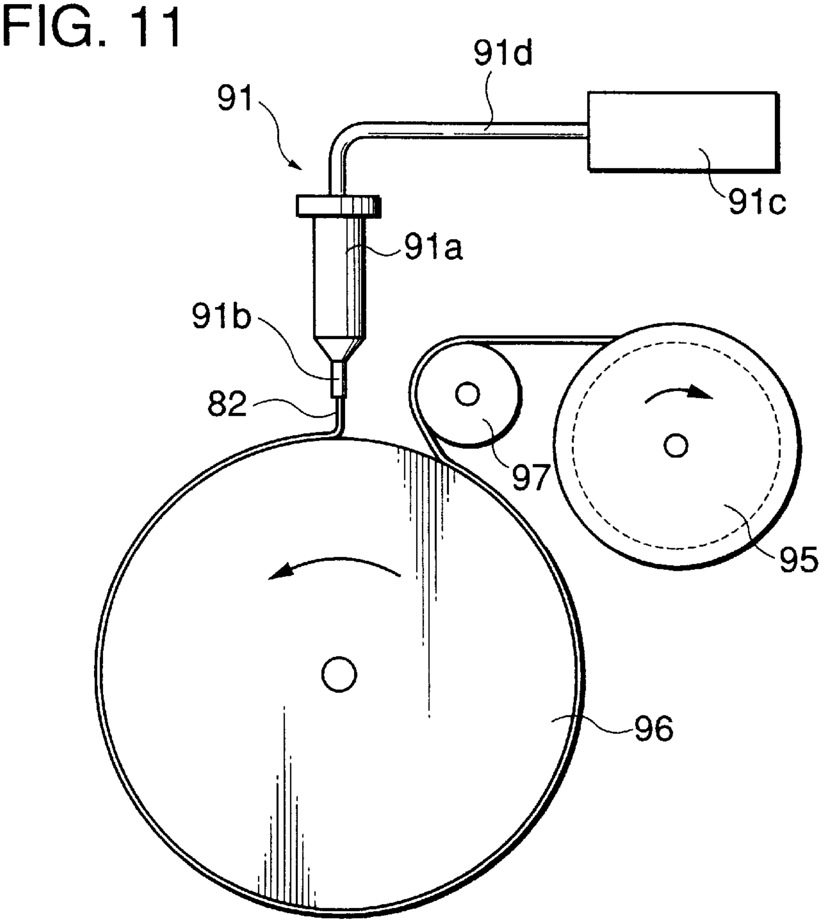
FIG. 11 is an explanatory view showing an essential part of a seventh embodiment according to the present invention.

FIG. 11 is a view showing another apparatus for forming the filament-like article in this Example. This apparatus is similar to the one shown in FIG. 10 in structure except that a heat drum 96 and a guide roller 97 are provided instead of the steel belt 93, the rotating rollers 92*a* and 92*b* and the heaters 94*a* and 94*b* in the apparatus of FIG. 10.

The heat drum 96 is a drum made of metal and incorporating a heater inside. The filament-like phosphor paste 82 ejected from the nozzle 91*b* adheres to the rotating heat drum 96 to be rotated for almost one turn in the direction indicated by an arrow while being dried to produce the filament-like article and is wound onto by the reel 95 though the guide roller 97.

According to the present invention, in the case of manufacturing large PDPs, phosphor layers are formed in the grooves on the substrate by adopting a method for placing the filament-like articles containing a phosphor substance into the grooves, thereby solving the problem of misalignment of the screen mask. The phosphor layers for red, green and blue are formed precisely between the ribs.

What is claimed is:

1. A method for forming a plurality of striped phosphor layers on a surface of a substrate constituting a plasma display panel, the surface having a plurality of parallel ribs disposed thereon and grooves each defined between two adjacent ribs, comprising:

molding a phosphor paste composed of a phosphor and a first synthetic resin into a plurality of filament articles;

placing one of the molded filament articles into each groove;

filling the grooves with a solvent optionally containing a second synthetic resin compatible with the first synthetic resin; and conducting a sintering treatment of the substrate to form the phosphor layers in the grooves.

2. The method of claim 1, wherein the step of molding the phosphor paste into the filament articles comprises printing the phosphor paste on a flat surface of a supporter through a screen mask having a striped opening pattern, subjecting the printed phosphor paste to thermal treatment and peeling the resulting filament articles from the flat surface.

3. The method of claim 1, wherein the step of molding the phosphor paste into the filament articles comprises applying the phosphor paste in a straight line via a nozzle on a surface of a rotating endless supporter and continuously peeling the resulting filament articles from the surface.

4. The method of claim 1, wherein the step of molding the phosphor paste into the filament articles comprises forming three kinds of filament articles having first, second and third colors, the step of placing one of the filament articles into each groove comprises placing one of the filament articles having the first color into a group of the grooves at an interval of three rib pitches, placing one of the filament articles having the second color into another group of the grooves at said interval and placing one of the filament articles having the third color into the other group of the grooves at said interval, and the step of filling the grooves with the solvent is carried out simultaneously for all of the grooves.

5. The method of claim 1, wherein the step of placing one of the filament articles into each groove comprises supporting both ends of each filament article above the substrate to align the filament article with the groove and then lowering and placing the filament article into the groove.

6. The method of claim 1, wherein the step of placing one of the filament articles into each groove comprises providing a cylinder with a channel circumferentially formed thereon, putting each filament article into the channel and transferring each filament article from the channel to the groove with the cylinder rotated and moved on the substrate.

7. The method of claim 1, wherein the step of placing one of the filament articles into each groove comprises providing a member with a nozzle for feeding each filament article and moving the member along the groove to feed the filament article through the nozzle into the groove.

8. A method for forming a plurality of striped phosphor layers on a surface of a substrate constituting a plasma display panel, the surface having a plurality of parallel ribs disposed thereon and grooves each defined between two adjacent ribs, comprising:

placing a molded filament article into each groove, the filament article being made of a phosphor substance and a first synthetic resin;

filling the grooves with a solvent optionally containing a second synthetic resin compatible with the first synthetic resin; and conducting a sintering treatment of the substrate to form the phosphor layers in the grooves.

9. A method for forming a plurality of phosphor layers on a substrate having a plurality of adjacent grooves, comprising:

forming a phosphor paste composed of a phosphor and a first synthetic resin into a plurality of filament articles;

placing one of the filament articles into each groove;

filling the grooves with a high-viscosity solvent; and heating the substrate to form the phosphor layers in the grooves.

10. A method for forming a plurality of phosphor layers on a substrate having a plurality of adjacent partitions, comprising:

forming a phosphor paste composed of a phosphor and a first synthetic resin into a plurality of filament articles;

placing one of the filament articles between adjacent partitions;

placing a high-viscosity solvent between adjacent partitions; and heating the substrate to form the phosphor layers between adjacent partitions.

* * * * *